US005749565A

United States Patent [19]
Frost et al.

[11] Patent Number: 5,749,565
[45] Date of Patent: May 12, 1998

[54] OPTICAL FIBRE INSTALLATION TOOL

[75] Inventors: Peter Lewis John Frost, Suffolk; Paul David Jessop, Essex, both of United Kingdom

[73] Assignee: British Telecommunications public limited company, London, England

[21] Appl. No.: 433,426

[22] PCT Filed: Mar. 2, 1995

[86] PCT No.: PCT/GB95/00450

§ 371 Date: Dec. 15, 1995

§ 102(e) Date: Dec. 15, 1995

[87] PCT Pub. No.: WO95/23988

PCT Pub. Date: Sep. 8, 1995

Related U.S. Application Data

[63] Continuation-in-part of Ser. No. 230,382, Apr. 20, 1994, Pat. No. 5,503,369.

[30] Foreign Application Priority Data

Mar. 2, 1994 [EP] European Pat. Off. .............. 94301511

[51] Int. Cl.$^6$ ................................................. B65H 59/00
[52] U.S. Cl. ................................................... 254/134.4
[58] Field of Search .......................... 254/134.3 FT, 254/134.3 R, 134.4; 15/109.06 R; 226/25, 43, 178

[56] References Cited

U.S. PATENT DOCUMENTS

| | | | |
|---|---|---|---|
| 3,038,702 | 6/1962 | Trunnell | 254/134.3 FT |
| 3,201,090 | 8/1965 | Jones | 254/134.3 FT |
| 3,306,581 | 2/1967 | Miller | 254/134.3 FT |
| 3,610,582 | 10/1971 | Passoni | 254/134.3 FT |
| 4,529,171 | 7/1985 | Woodruff | 254/134.3 FT |
| 4,596,381 | 6/1986 | Hamrick . | |
| 4,796,865 | 1/1989 | Marchetti | 254/134.3 R |
| 4,934,662 | 6/1990 | Griffioen et al. | 254/134.4 |
| 4,951,923 | 8/1990 | Couture | 254/134.3 R |
| 5,046,674 | 9/1991 | Kolschbach et al. | 254/134.4 |
| 5,169,126 | 12/1992 | Reeve et al. | 254/134.4 |
| 5,499,797 | 3/1996 | Sano et al. | 254/134.4 |

FOREIGN PATENT DOCUMENTS

| | | |
|---|---|---|
| 0292037 | 11/1988 | European Pat. Off. . |
| 3530344 A1 | 8/1985 | Germany . |
| A3911095 | 4/1989 | Germany . |
| 9114452 U | 11/1991 | Germany . |
| 50-79022 | 11/1977 | Japan .......... 254/134.3 FT |

OTHER PUBLICATIONS

Kukita, "Design and Peformance of Optical Drop and Indoor Cable", Review Electrical Communication Laboratories, vol. 32, No. 4, 1984, JP, pp. 636–645.

McIntosh, "Lighwave Technology Enters the Premise Market", ATT Technology, vol. 2, No. 1, 1987, US, pp. 22–29.

*Primary Examiner*—Robert C. Watson
*Attorney, Agent, or Firm*—Nixon & Vanderhye P.C.

[57] ABSTRACT

A tool is provided for installing an optical fibre transmission line between the inside of a customer's premises and the outside thereof along a pre-installed tubular pathway which passes through an aperture in a wall of said premises. The tool comprising a housing, a motor mounted within the housing, a motor output shaft, and a pair of drive wheels. At least one of the drive wheels is drivably connected to the output shaft of the motor. The drive wheels are mounted on the housing for relative movement towards/away from one another, whereby the optical fibre transmission line can be driven along the tubular pathway by the inter-engagement of the counter-rotating drive wheels. The tool may incorporate an air injector unit for propelling the transmission line along the tubular pathway by fluid drag of air passed through the pathway.

5 Claims, 2 Drawing Sheets

5,749,565

1
OPTICAL FIBRE INSTALLATION TOOL

This is a continuation-in-part of application Ser. No. 08/230,382, filed Apr. 20, 1994 now U.S. Pat. No. 5,503,369.

BACKGROUND OF THE INVENTION

1. Field of the Invention

This invention relates to an optical fibre installation tool, and in particular to a tool for use in customer lead in (CLI) operations, that is to say the way in which optical fibres (such as telecommunications optical fibres) are led into customers' premises.

2. Related Art

In the United Kingdom, the telecommunications network includes a trunk network which is substantially completely constituted by optical fibre, and a local access network which is substantially completely constituted by copper pairs. Eventually, it is expected that the entire network, including the access network, will be constituted by fibre.

The ultimate goal is a fixed, resilient, transparent telecommunications infrastructure for the optical access network, with capacity for all foreseeable service requirements. One way of achieving this would be to create a fully-managed fibre network in the form of a thin, widespread overlay for the whole access topography, as this would exploit the existing valuable access network infrastructure. Such a network could be equipped as needs arise, and thereby could result in capital expenditure savings, since the major part of the investment will be the provision of terminal equipment on a 'just in time' basis. It should also enable the rapid provision of extra lines to new or existing customers, and flexible provision or In order to be completely future proof, the network should be single mode optical fibre, with no bandwidth limiting active electronics within the infrastructure. Consequently, only passive optical networks (PONs) which can offer this total transparency and complete freedom for upgrade, should be considered.

In a PON, a single optical fibre is fed out from the exchange head-end (HE), this fibre being fanned out via passive optical splitters at cabinets and distribution points (DPs) to feed optical network units (ONUs). The ONUs can be in customer' premises, or in the street serving a number of customers. The use of optical splitters enables sharing of feeder fibre and exchange based optical line termination (OLT) equipment, thereby giving PONs a cost advantage. In the United Kingdom, simplex PONs are planned, so that each customer is serviced by a pair of optical fibres.

In order to achieve the goal of providing a fixed, resilient, transparent telecommunications optical fibre access network, it will be important to minimise the installation costs at each part of the network. The present invention is concerned with minimising the cost of installation of fibre from a customer's premises to the nearest network node, and in particular to a cost-effective way of getting fibre into a customer's premises. In this connection, it should be noted that the preferred way of installing fibre is by the well known fibre blowing process (see EP 108590). In this process, a fibre unit (usually a four-fibre unit for residential premises) is blown through a small diameter (5mm) polyethylene tube.

SUMMARY OF THE INVENTION

The present invention provides a tool for installing an optical fibre transmission line between the inside of a customer's premises and the outside thereof along a pre-installed tubular pathway which passes through an aperture in a wall of said premises, the tool comprising a housing, a motor mounted within the housing, a motor output shaft, and a pair of drive wheels, at least one of the drive wheels being drivably connected to the output shaft of the motor, and the drive wheels being mounted on the housing for relative movement towards/away from one another, whereby the optical fibre transmission line can be driven along the tubular pathway by the inter-engagement of the counter-rotating drive wheels.

Preferably, the tool further comprises a slipping clutch provided between the motor and the output shaft. Advantageously, the motor is provided with means such as gearing for reversing the direction of drive of the output shaft.

The tool may further comprise guide means for guiding the optical fibre transmission line to the nip between the drive wheels, and support means for supporting an end portion of the tubular pathway at the other side of the nip.

In a preferred embodiment, an air injector unit constitutes the guide means and the support means, the air injector unit being provided with means for injecting pressurised air into the tubular pathway.

Advantageously, a grooved input member constitutes the guide means, and a grooved output member constitutes the support means, the input member being connected to the output member by a necked body portion shaped to fit between the drive wheels. Preferably, the output member includes air injection needle means for directing pressurised air to the interior of said end portion of the tubular pathway, the air injection needle means being connected to an input manifold.

The invention also provides a method of providing an optical communications route between the inside of a customer's premises and a node of an optical telecommunications network, the method comprising the step of moving an optical fibre transmission line comprising at least one optical fibre along first and second pre-installed tubular pathways, the first tubular pathway passing from the inside of the customer's premises to the outside thereof via an aperture in a wall of said premises, and the second tubular pathway passing from the outside of said premises to the network node, wherein the optical fibre transmission line is fed through the first tubular pathway by a mechanical pushing process, and wherein the optical fibre transmission line is propelled along the second tubular pathway by fluid drag of a gaseous medium passed through the second tubular pathway towards to the network node.

The invention further comprises a method of providing an optical communications route between the inside of a customer's premises and a node of an optical telecommunications network, the method comprising the step of moving an optical fibre transmission line comprising at least one optical fibre along a pre-installed tubular pathway passing from the inside of the customer's premises to the network node via an aperture in a wall of said premises, wherein the optical fibre transmission line is fed to the tubular pathway by a mechanical pushing process, and wherein the optical fibre transmission line is propelled along the tubular pathway by the mechanical pushing process and by fluid drag of a gaseous medium passed through the tubular pathway towards to the network node.

In either case, the method may further comprise the step of connecting the optical fibre transmission line to network termination equipment inside the customer's premises.

Advantageously, the optical fibre transmission line is provided with pre-connectorised tails, and the connection step is constituted by connecting the pre-connectorised tails to opto-electronics of the network termination equipment. Alternatively, the optical fibre transmission line is provided with optical connectors, and the connection step is constituted by connecting the optical connectors to optical connection means of the network termination equipment.

The invention also provides apparatus for feeding an optical fibre transmission line between the inside of a customer's premises and a node of an optical telecommunications network along first and second pre-installed tubular pathways, the first tubular pathway passing from the inside of the customer's premises to the outside thereof via an aperture in a wall of said premises, and the second tubular pathway passing from the outside of said premises to the network node, the optical fibre transmission line comprising at least one optical fibre, the apparatus comprising a mechanical drive for pushing the optical fibre transmission line through the first tubular pathway, and a fibre blowing unit for propelling the optical fibre transmission line along the second tubular pathway by fluid drag of a gaseous medium supplied by the fibre blowing unit so as to pass through the second tubular pathway towards the network node.

The invention still further provides apparatus for feeding an optical fibre transmission line between the inside of a customer's premises and a node of an optical telecommunications network along a pre-installed tubular pathway passing from the inside of the customer's premises to the network node via an aperture in a wall of said premises, the optical fibre transmission line comprising at least one optical fibre, the apparatus comprising a mechanical drive for feeding the optical fibre transmission line into the tubular pathway, and a fibre blowing unit for propelling the optical fibre transmission line along the tubular pathway by fluid drag of a gaseous medium supplied by the fibre blowing unit so as to pass through the tubular pathway towards the network node, and wherein the mechanical drive assists with the propelling of the optical fibre transmission line along the tubular pathway.

BRIEF DESCRIPTION OF THE DRAWINGS

The invention will now be described in greater detail, by way of example, with reference to the accompanying drawings, in which.

DETAILED DESCRIPTION OF EXEMPLARY EMBODIMENTS

When connecting a customer to the nearest network node, it is sometimes preferable to carry out the blowing of the fibre from outside that customer's premises. In order to provide a complete installation path from the customer's NTE to a network node, therefore, it is necessary to provide a separate means for installation of fibre from the NTE through pre-installed blown fibre tubing 100, to a fibre blowing unit positioned outside the customer's premises.

The tubing will have already been installed from the interior of the premises to the exterior via CLI apparatus which can guide optical fibre unit though 90° bends without subjecting the fibres of that unit to bends which would lead to an additional optical loss. In this connection it will be appreciated that the tubing has to be fed along the inner wall of the customer's premises and then turned through 90° so as to pass through a hole formed in the wall. It must then be turned through 90° at the outer wall so that it can subsequently be fed along that wall. This arrangement is more fully depicted in our parent application Ser. No. 08/230,382 filed Apr. 20, 1994 (now issued U.S. Pat. No. 5,503,369).

Figure 1:
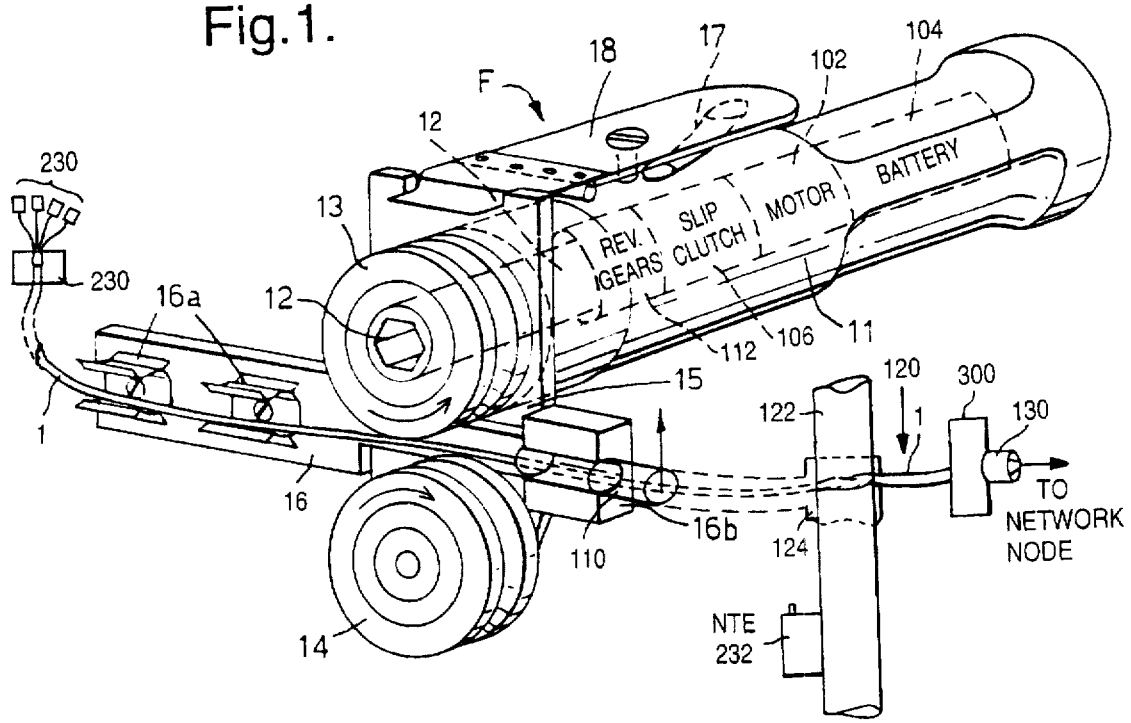
FIG. 1 is a perspective view of a fibre insertion tool constructed in accordance with the invention.
Figure 2:
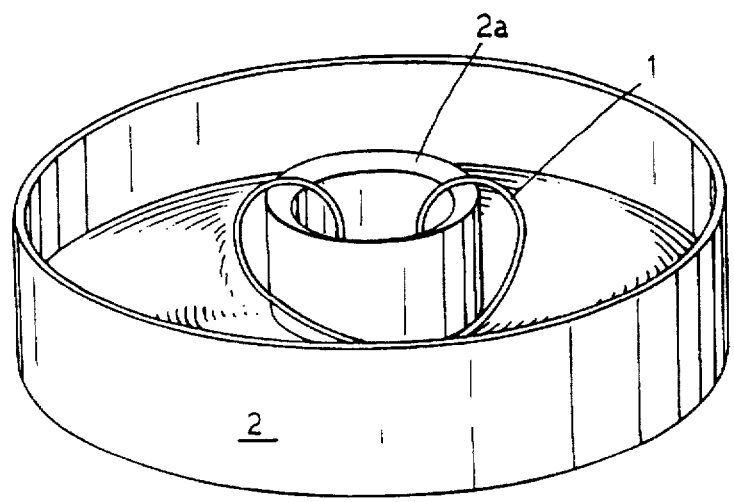
FIG. 2 is a perspective view of a mini pan containing an optical fibre unit.

FIG. 1 shows a fibre unit installation tool F which can be used for mechanically pushing a fibre unit 1 (typically a four—fibre unit for a residential customer—two of the fibres being for use by the customer, and two being provided as spares) from a mini pan 2 (see FIG. 2). The mini pan 2 is a container in which the fibre unit 1 is coiled round a central boss 2a, the free end of the fibre unit being fed away from the mini pan after passing down through the central boss.

The fibre unit installation tool F is a modified form of electric screwdriver, having a motor 102 and a battery 104 housed in a handle portion 11. The motor drives an output shaft 12 via a factory set slipping clutch 106. The output shaft 12 is connected to a drive wheel 13, the drive wheel engaging, in use, with an idler wheel 14 mounted on the unit F by means of a support plate 15. The support plate 15 also supports a guide plate assembly 16. The assembly 16 includes a pair of tube connector grips 16a and a tube guide 16b, these being positioned respectively at the entry and exit of the nip between the two wheels 13 and 14. The idler wheel 14 is biased towards the drive wheel 13 by means of a spring 17 which acts between the handle portion 11 and a plate 18 which is pivotally mounted on the handle portion and which carries the support plate 15.

In order to feed the fibre unit 1 from the mini pan 2 positioned within a customer's premises, the pre-installed tubing is positioned in the guide 16b. The free end of the fibre unit is then fed to the nip between the two wheels 13 and 14 of the installation tool F. When the tool F is activated, the fibre unit 1 is driven through the nip by the interengagement of the drive wheel 13 and the idler wheel 14, the fibre unit being fed away from the tool via the grip 16b. The free end of the fibre unit 1 is then inserted into the free end of the tubing which has already been fed to the outside 120 of the customer's premises 122 via the CLI apparatus 124 (see parent Pat. No. 5,503,369). The tool F is capable of feeding about 10 meters of the fibre unit 1, and so is quite adequate to feed a sufficient length of the fibre unit to a blowing unit positioned outside the customer's premises. The slipping clutch 106 of the tool F limits the torque that the tool can apply, and so protects the fibre unit 1 during the mechanical pushing process. The tool F is also provided with a reversing mechanism 112, so that it can be used to remove (pull out) the installed fibre unit 1 should the need arise. Once the free end of the fibre unit 1 has been mechanically pushed through the tubing 110 to the outside of the customer's premises, it is then fed into a further blown fibre tubing 130 for blowing through to the network node in the normal way. In this connection, it should be noted that the further blown fibre tubing (the further tubing) will have already been installed from outside the customer's premises to the network node.

The fibre unit 1 in the mini pan 2 is provided with pre-connectorised tails 230 for termination on customer electronics NTE 232. The advantage of this is that, during installation, the installer does not need a specialist splicing kit to connect the optical fibre unit to the customer electronics. The fibre unit 1 is also provided with a breakout unit 230 about 100 mm from the pre-connectorised tails. The breakout unit separates the fibres in the fibre unit 1 for connectorisation. In use, the breakout unit will engage with the wheels 13 and 14 of the fibre unit installation tool F to prevent the fibre unit being pushed right through the tubing.

The procedure for installing a fibre unit 1 from within a customer's premises 122 to the nearest network node is as follows 1) The further tubing is installed between the network node and the external wall of the customer's premises. This tubing can be routed either via a drop cable or underground ducting.
2) A suitable length of the tubing is pushed through the CLI apparatus 124 from the inside of the premises to the outside.
3) The tubing and the further tubing are then cut to length ready for connectorisation. A guaranteed seal connector (not shown) may then be used to connect the two lengths of tubing together.
4) An 0-ring is then positioned over the tubing within the cavity of the wall using a special tool.
5) The fibre unit 1 is then pushed through the tubing from the inside of the customer's premises to the outside using the installation tool F. The fibre unit 1 is pushed only as far as the external connector used to connectorise the tubing and the further tubing.
6) The external connector is removed, and the fibre unit 1 is blown along the further tubing to the network node using standard fibre blowing equipment 300. The external connector is then re-made, and the fibres of the fibre units are spliced to system fibres within the network node.
7) The pre-connectorised tails 230 of the fibre unit 1 are then terminated on the opto-electronics of the customer's network termination equipment (not shown).

Figure 3:
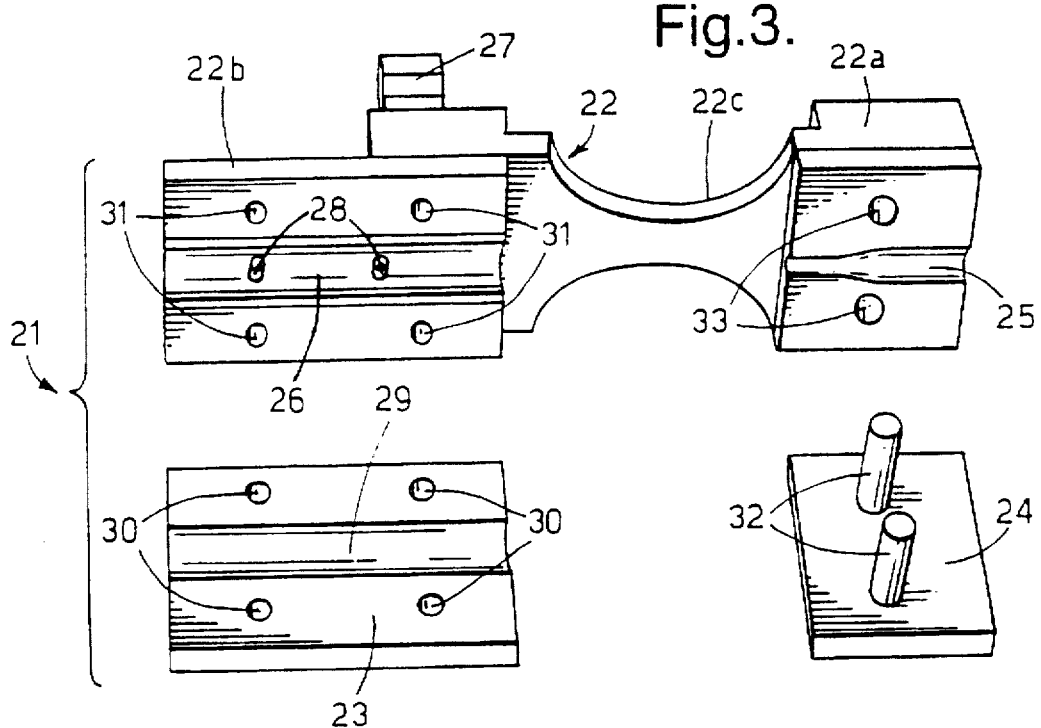
FIG. 3 is an exploded perspective view of an air injector unit for use with the tool of FIG. 1.

Although the fibre installation tool F described above performs well in installing an optical fibre unit from inside a customer's premises 122 to a conventional blowing unit positioned outside those premises, it is not capable of installing an optical fibre unit from inside a customer's premises all the way to the nearest network node. In most cases, it would be preferable to provide a fibre installation tool that could carry out this installation in one step. In order to do this, the fibre installation tool F of FIGS. 1 and 2 can be modified by replacing the guide plate assembly 16 by a detachable air injector unit 21 (see FIG. 3). The air injector unit 21 is constituted by a main body portion 22 and two clamping plates 23 and 24.

The main body 22 includes a fibre unit input member 22a connected to an injector head/fibre unit output member 22b by a necked body portion 22c. The input member 22a is formed with a groove 25 which is aligned with a groove 26 formed in the injector head 22b. The groove 25 constitutes guide means for a fibre unit (not shown), and the groove 26 is used to hold a blown fibre tubing (not shown), which leads to the nearest network node. The injector head 22a is provided with an air input manifold 27 which leads to a pair of air injector needles 28 positioned 15mm apart along the central longitudinal axis of the groove 26.

Figure 4:
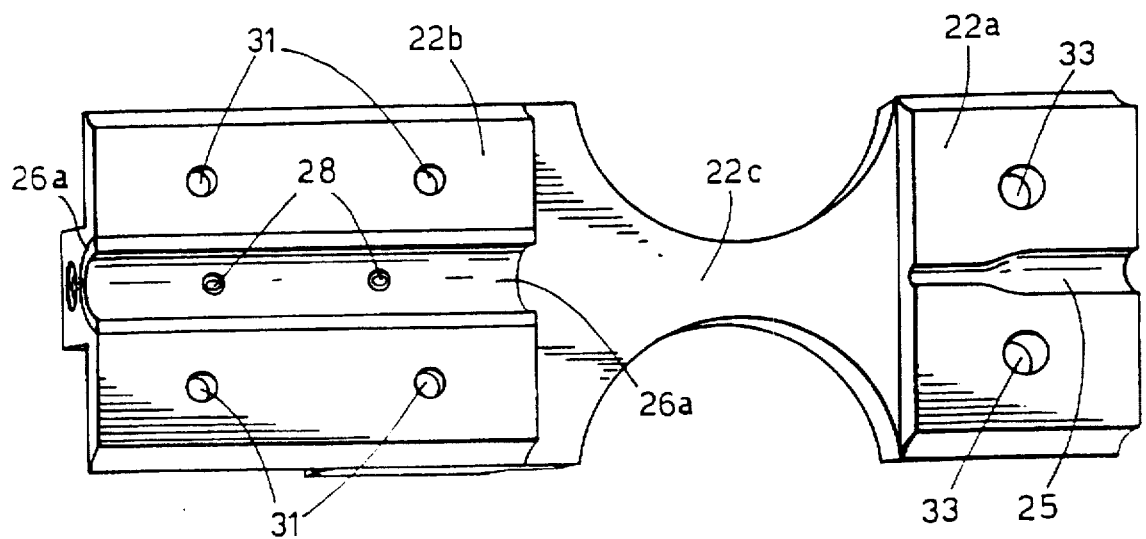
FIG. 4 is a perspective view of the main body of the air injector unit of FIG. 3.

The plate 23 is formed with a groove 29 which, when the plate is fixed to the injector head 22b by means of screws (not shown) passing through apertures 30 and 31 formed respectively in the plate and the injector head, complement the groove 26 to define a cylindrical housing for the blown fibre tubing. The base of the groove 26 is covered by a rubber mat 26a (see FIG. 4). The rubber mat 26a is apertured so that the air injector needles 28 can pass therethrough, the mat providing a seal between the needles and the outer wall of the blown fibre tubing.

The necked body portion 22c of the air injector unit 21 facilitates attachment of the unit to, and detachment from, the support plate 15 of the fibre installation tool F. It also ensures that the input member 22a is positioned at the input side of the nip between the two wheels 13 and 14, and the injector head 22b is positioned at the output side of the nip. The air injector unit 21 is detachably fixed to the support plate 15 by any suitable means, such as detent balls which snap into sockets.

In use, the air injector unit 21 is removed from the support plate 15 so that the fibre unit 1 (not shown in FIGS. 3 and 4) can be positioned within the blown fibre tubing ready for the installation process. The first step is to remove the clamping plates 23 and 24 from the main body portion 22. The blown fibre tubing is then formed with two punched holes, which are positioned 15mm apart, using a special pair of pliers (not shown). The pliers are provided with a stop member against which the end of the blown fibre tubing can be positioned prior to the piercing process. The stop member is positioned so that the holes are punched predetermined distances from the end of the tubing whereby, when the tubing is placed within the groove 26 with the holes in alignment with the needles 28, the free end of the tubing extends over the necked body portion 22c. The fibre unit 1 is then pushed through a seal (not shown) which is subsequently positioned within the free end of the blown fibre tubing. The seal is constituted by a hollow cylindrical bung provided with a two-start external screw thread by means of which the seal can be screwed into the free end of the tubing. The hollow cylindrical aperture within the seal has a diameter of 1mm, so that the fibre unit 1 is a friction fit within this aperture. The two holes in the tubing are then aligned onto the needles 28, and the clamping plate 23 is screwed onto the output member 22b. The clamping plate 24 is then pushed onto the input member 22a to ensure that the fibre unit 1 is correctly positioned in alignment with the end of the blown fibre tubing. A hose (not shown) is then connected to the air input manifold 27.

The air injector unit 21 is then fixed to the support plate 15, care being taken to ensure that the idler wheel 14 does not foul the seal. The fibre unit 1 is then driven into the tubing by activating the tool F so that the fibre unit is driven through the nip between the wheels 13 and 14. Once the fibre unit 1 is positioned within the blown fibre tubing, a compressor (not shown) attached to the hose is turned on, so that the fibre unit is driven into the tubing by the fluid drag of the air passing along tubing. The compressor is arranged to supply air at 150 psi. This installation process 35 is assisted by the mechanical drive constituted by the interengagement of the drive wheel 13 and the idler wheel 14 of the tool F with the fibre unit.

Installation is continued until the breakout unit at the free end of the fibre unit 1 seats within the wider portion of the groove 25 in the input member 22a. With the air still on, the injector unit 21 is then removed from the support plate 15, the clamping plate 24 is removed from the input member 22a, and a breakout unit (not shown) is pushed over the seal to snap-engage thereover. The air supply is then turned off, and the clamping plate 23 is removed from the output member 22b. The fibre unit 1, the tubing and the associated breakout unit can then be removed from the injector unit 21. The breakout unit is effective to terminate the optical fibres within the fibre unit 1 ready for connection to fibres at a network node or ONU.

It will be apparent that modifications could also be made to the arrangements described above. For example, the pre-connectorised tails provided on the fibre unit 1 could be replaced by optical connectors which could terminate on an optical connector termination box. Also, the air injector unit 21 of FIGS. 3 and 4 could have a different number of air injection needles, the spacing between which could be different. Again, the internal diameter of the seal is not necessarily 1mm, this diameter being chosen to be a friction fit around the fibre unit being installed, and this will vary for different fibre units.

We claim:

1. A hand held tool for installing an optical fibre transmission line between the inside of a customer's premises and the outside thereof along a pre-installed tubular pathway which passes through an aperture in a wall of said premises, the tool comprising:

a housing, a motor mounted within the housing, a motor output shaft, and a pair of drive wheels, at least one of the drive wheels being drivably connected to the output shaft of the motor, the drive wheels being mounted on the housing for relative movement towards/away from one another, guide means for guiding the optical fibre transmission line to the nip between the drive wheels, support means for supporting an end portion of the tubular pathway at the other side of the nip, wherein an air injector unit constitutes the guide means and the support means, the air injector unit being provided with means for injecting pressurised air into the tubular pathway, and whereby the optical fibre transmission line can be driven along the tubular pathway by the inter-engagement of the counter-rotating drive wheels.

2. A hand held tool as in claim 1, wherein:

a grooved input member constitutes the guide means, and a grooved output member constitutes the support means, the input member being connected to the output member by a necked body portion shaped to fit between the drive wheels.

3. A hand held tool as in claim 2, wherein:

the output member includes air injection needle means for directing pressurised air to the interior of said end portion of the tubular pathway.

4. A hand held tool as in claim 3, wherein:

the air injection needle means are connected to an air input manifold.

5. A hand held tool as in claim 3 wherein:

a pair of air injector needles constitutes the air injector means.

* * * * *